United States Patent

[11] 3,557,919

| [72] | Inventor | Franz Speich<br>Windisch, Switzerland |
|---|---|---|
| [21] | Appl. No. | 780,410 |
| [22] | Filed | Dec. 2, 1968 |
| [45] | Patented | Jan. 26, 1971 |
| [73] | Assignee | Geroge Fischer Ltd., Brugg<br>Aargau, Switzerland |
| [32] | Priority | Dec. 4, 1967 |
| [33] | | Switzerland |
| [31] | | 16991/67 |

[54] CLUTCH AND BRAKE FOR WEAVING MACHINES
7 Claims, 6 Drawing Figs.

[52] U.S. Cl. ................................................... 192/14,
192/18, 192/89, 192/96, 192/109, 192/110
[51] Int. Cl. ................................................... F16d 67/02
[50] Field of Search ........................................... 192/14, 18

[56] References Cited
UNITED STATES PATENTS

| 2,455,900 | 12/1948 | Yardeny et al. | 192/14 |
| 2,597,685 | 5/1952 | Turner | 192/14 |
| 2,646,520 | 7/1953 | Labastie | 192/18X |
| 2,757,766 | 8/1956 | McCroskey et al. | 192/18 |

*Primary Examiner*—Benjamin W. Wyche
*Attorney*—Rodney C. Southworth

ABSTRACT: The invention pertains to a driving unit, particularly for weaving machines, having a clutch disc in a housing, the clutch disc being axially displaceable between a flywheel arranged of the shaft of a motor coupled to the unit and a fixed brake ring in the housing. This unit is to a great extent independent of the motor coupled to it and control is confined to the unit, the motor serving as a source of motive power only.

PATENTED JAN 26 1971

INVENTOR.
FRANZ SPEICH
BY Rodney C. Southworth
ATTORNEY

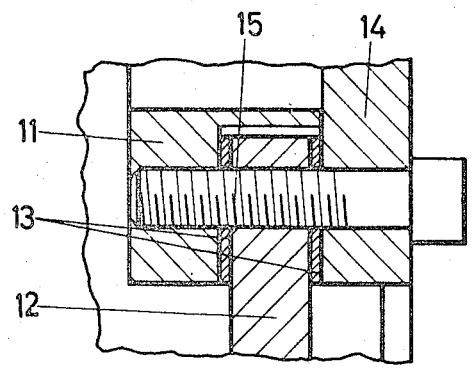
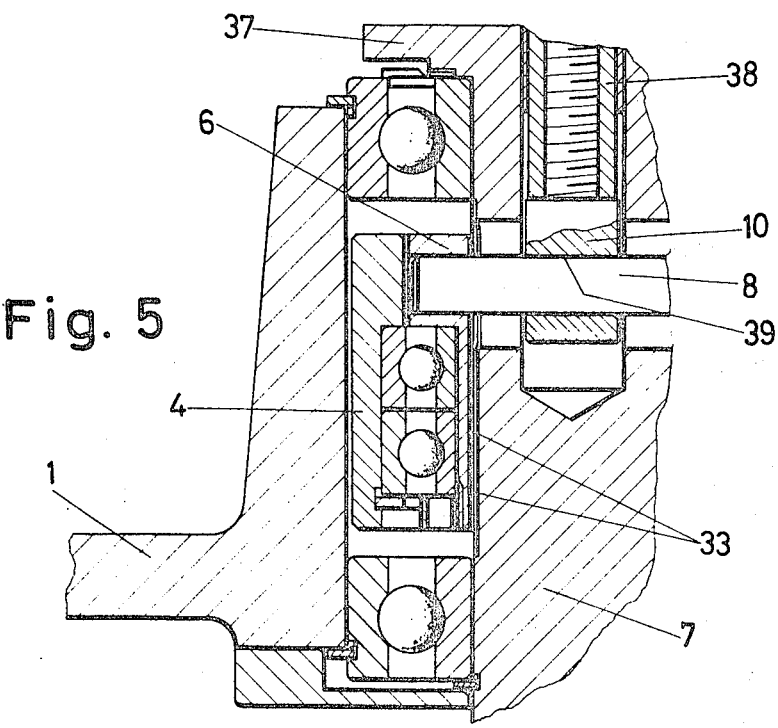

3,557,919

CLUTCH AND BRAKE FOR WEAVING MACHINES

BACKGROUND OF THE INVENTION

Various power means of somewhat similar arrangement are so far known, some of which have the clutch disc rigidly connected to the driving shaft. The driving shaft is then borne in a housing but is axially displaceable therein. The torque to be transferred from a motor to the weaving machine is thereby determined by springs functioning in a linkage externally of the unit involved.

Other designs are also known in which the friction lining is applied to a comparatively thin disc which is axially flexible. The thickness of these clutch discs is determined by the torque to be transmitted at the fixed driving shaft and is a measurement for the axial flexibility.

In still another design clutch torque is dependent upon the clutch pressure, which is also determined by springs, being transferred to a rotating compression ring by means of a transfer mechanism which rotates partly with the flywheel disc or the motor shaft, respectively. Under the spring pressure the clutch disc is thereby clamped between flywheel disc and compression ring. The power transmitting means of this arrangement incorporate the disadvantage that tow of the aforedescribed clutches or clutch units on the pinion shaft are necessary for a combined drive with clutch and brake, whereby one unit, through actuation of the transfer mechanism in direction of the brake, acts as a brake. A further disadvantage of this arrangement is that with a worn friction lining the clutch disc comes to lie theoretically conical onto the flywheel disc which leads to irregular wear of the friction lining.

An object of the invention is that of devising a power unit which upon starting the weaving machine, allows to bring the machine rapidly to its operating speed, but also is so designed as to absorb small inconsistencies of alignment of the motor and the unit shaft as well as the parallelism of the engaging surfaces of the flywheel disc or brake ring with the clutch and brake facings, respectively.

Another object is that of providing a simple unit to which any suitable motor may be coupled, e.g. sealed motors, air-cooled motors or a power change may be made, say, from 1 horsepower to 1½ or 2 horsepower if a change in the character and use of the weaving machine should require more power. With one standard unit of the maximum torque-transmitting capabilities likely to be demanded, a great range of driving conditions may be satisfied.

Another object is the realization of a power unit in which the torque transmission, braking and control therefor are confined to the transmission unit while the driving motor remains independent, thus maintenance, lubrication, etc., are independent.

SUMMARY OF THE INVENTION

According to the invention these objects are achieved by the fact that a rigid clutch disc, each side of which is provided with a circular ring-shaped friction lining, is connected fast for rotation or braking, to an axially restrained pinion shaft borne in a unit housing and that for the transfer of torque from a motor driven member, elastic-deformable means are provided fixed at the clutch disc on the one hand and at the driving shaft on the other.

Two examples of configuration of the subject of invention are shown in the drawings.

BRIEF DESCRIPTION OF THE DRAWINGS.

FIG. 5 shows in detail, the pinion shaft and parts thereon, and

FIG. 6 show details of the clutch disc.

DESCRIPTION OF THE PREFERRED EMBODIMENT

The driving unit as per the invention is contained in a housing 1, and is preferrably to be mounted on the sidewall of a weaving machine. It can be actuated by an actuating member or members (not shown) which may function either mechanically, pneumatically or electrically. An example of such control may be seen in U.S. Pat. No. 2,884,016.

Figure 3:
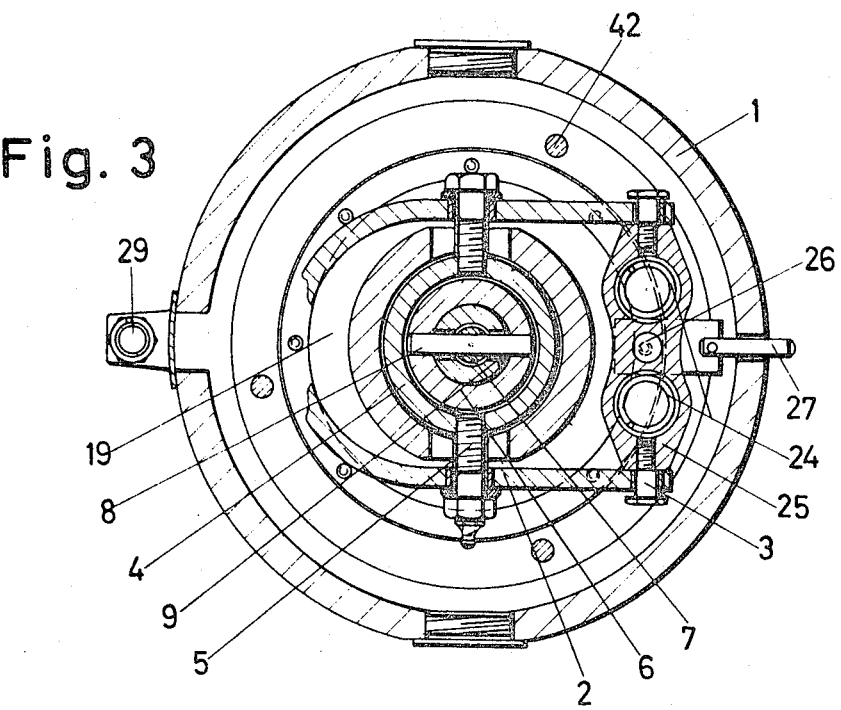
FIG. 3 shows a section along the line III–III in FIG. 1.

A forklike lever 2 is pivotably borne on two pivot pins 3 at a support 25, FIG. 3. Two pivot pins 5 provided at the lever 2 project into bearings in a bush 4 which is nonrotatable but arranged on bearings between it and another bush 6 free to rotate but axially fixed to move with bush 4, FIG. 5. The bush 6 is borne to slide on a pinion shaft and is axially displaceable within limits. A cross pin 8 is borne in bearing in the bush 6 and passes through a longitudinal slot 9 of the pinion or power takeoff shaft 7 and through a bore 39, FIG. 5, of a bolt 10 which is lengthwise displaceable in the center of the pinion shaft 7.

The bolt 10 carries via a spacing bush or sleeve 38 a driving disc 11 which as shown in FIG. 6, is connected with a comparatively thick disc 12 via screws 15 and two discs 13 of elastic material such as, e.g. rubber, and a flange or ring 14. The discs 13 of elastic material act as vibration absorbers at the beginning of a clutching or braking process, respectively, and also as compensating members at a possible bias position of the clutch disc 12 in relation to the clutch or brake surfaces 41 or 42. A part of the clutch disc 12 is provided on the one side with a brake lining 32 and on the other side with a clutch lining 31.

Figure 1:
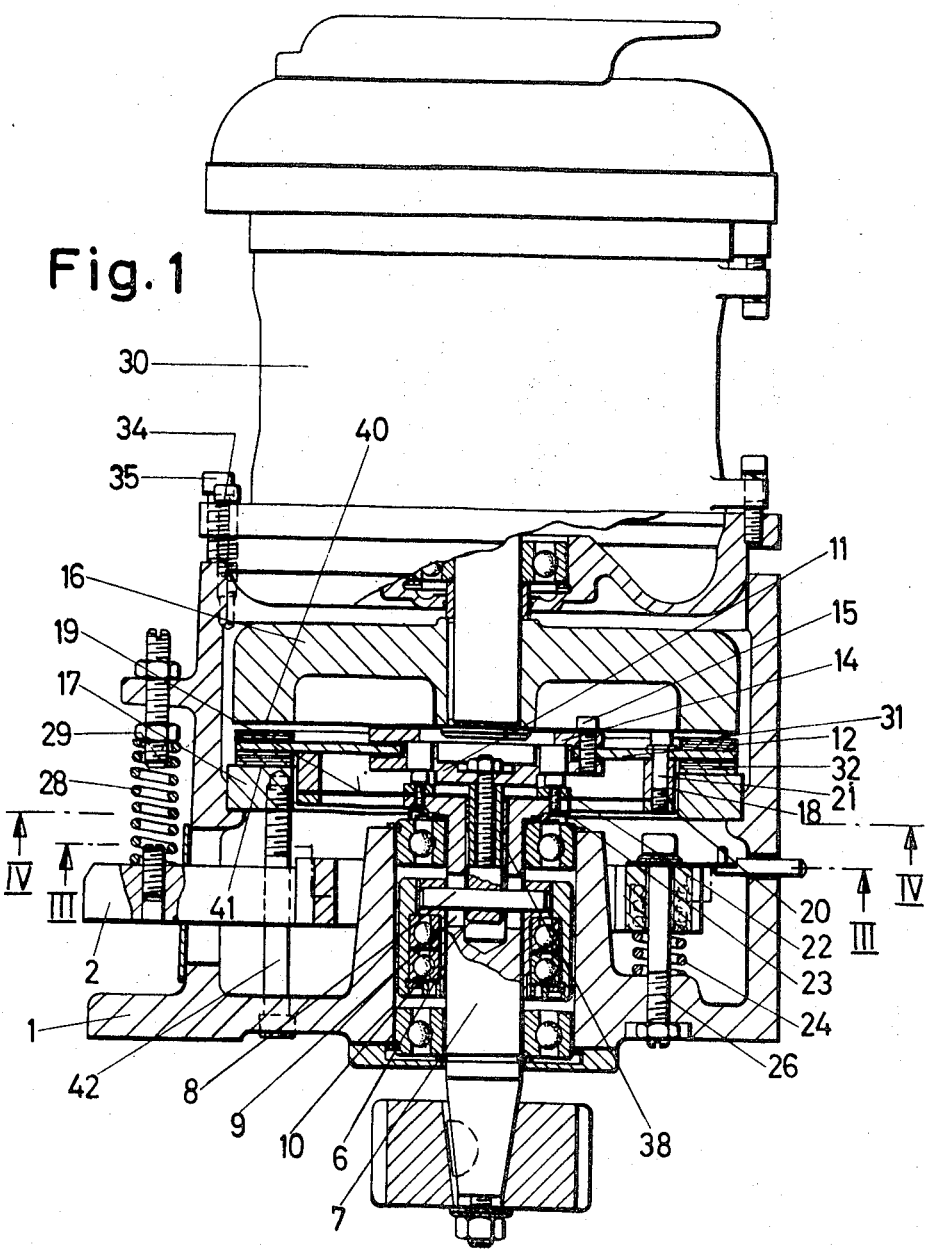
FIG. 1 is a partial section through the power unit as per the invention, shown in braked state.

A flywheel 16 is keyed on the shaft of the motor 30 with clutch surface 40 facing the clutch lining 31 of the clutch disc 12. A brake ring 17 is fixed in the housing 1 by means of screws 42, with a brake surface 41 facing the brake lining 32 of the clutch disc 12. A ring 18 and a ring 20 are fixed to the clutch disc 12 by means of screws 21. According to a first configuration as per FIGS. 1 and 2, the outer position of an elastic-deformable torque transfer member in the form of a membrane 19 is held between the two rings 18 and 20.

The inner portion of the membrane 19 is held between a flange part 37 of the driving shaft 7 and a ring 22 by means of screws 23. The membrane 19 can be made of spring steel, sheet metal or a plastic material, i.e. of any suitable elastic-deformable material.

Figure 4:
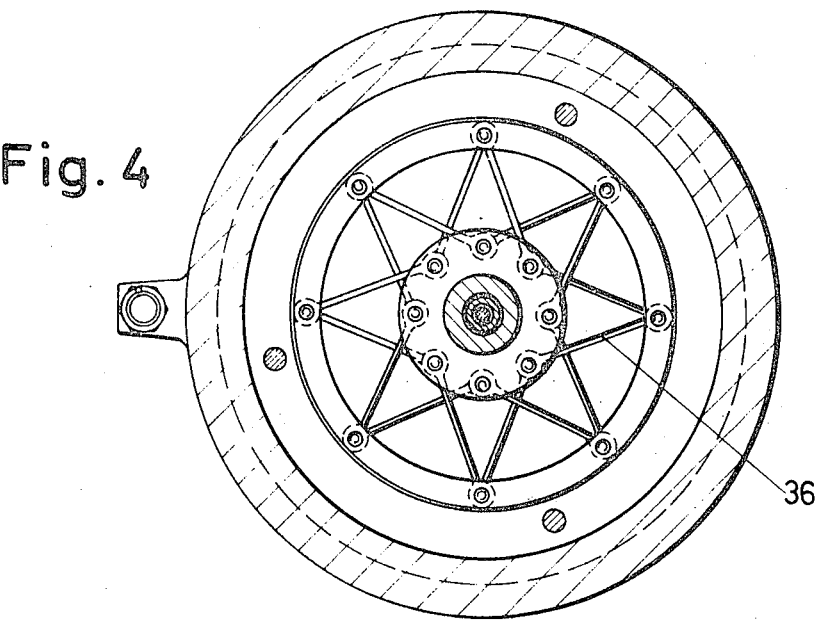
FIG. 4 is a section along the line IV–IV in FIG. 1, whereby a further configuration of the elastic-deformable means is shown.

In place of the full membrane 19 serving as a transfer member another design as per FIG. 4, could be used in which spoke-shaped elements 36, which are always under tension are provided. These elements can be made of spring steel or of plastic material, i.e. of an elastic-deformable material. Compression spring 24 arranged in a support 25 and a stop 26 serve to adjust and set the clutch pressure.

The driving motor 30 is flange mounted to the housing 1 by means of alternately arranged tension and compression screws 34 and 35, so that the clutch play can at any time be easily be adjusted from outside by closer or wider setting of the motor.

To avoid binding or seizing due to rust in the axially displaceable parts of the unit, it is advantageous to provide the bore of the bush 6 and the surface of the pinion shaft 7 in the moving or sliding range of the bush 6, with a plastic coating 33, FIG. 5.

Figure 2:
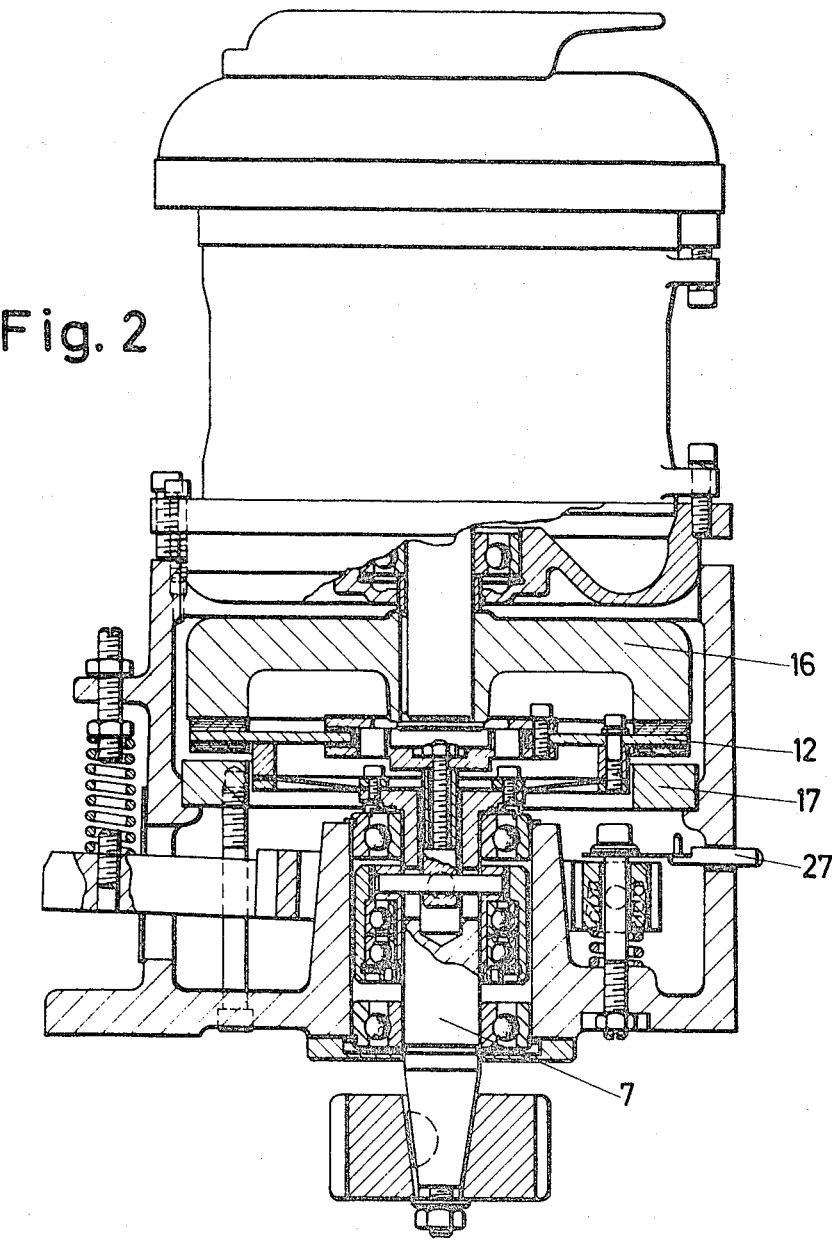
FIG. 2 is a partial section as in FIG. 1, the power unit being shown in clutched-in state.

The power unit as per the invention functions as follows:

FIG. 2 show the power unit in clutched-in position in which the torque of the motor 30 is transferred via the clutch surface 40 of the flywheel 16 to the clutch lining 31 of the clutch disc 12. The transfer from the clutch disc 12 is effected through membrane 19 held to rotate with the disc by the two rings 18 and 20 and fixed to the flanged part 37 of the pinion shaft by ring 22 thereby to drive that shaft. The limits of elasticity of the membrane are such as easily to permit the required axial motion of the clutch disc. The mount of torque to be transferred is determined by the two compression springs 24.

When the drive unit is clutched-in, which is done by actuating the lever 2 by means such as in the patent, above mentioned, the clutch disc 12 is in contact with the flywheel 16 and the clutch pressure achieved, the fulcrum of the lever 2 which is otherwise on the pivot pins 3 is transferred onto the pins 5. Thereby the support 25 moves against the pressure of the springs 24 and thus frees a feeler 27. As soon as the latter can be moved freely, the lever 2 is fixed by a device (not shown) and thus holds the unit in clutched-in position.

If the lever 2 is released from the clutched-in position by the control device, the disc 12 under the pressure of the brake spring 28, strikes against the brake ring 17 which is rigidly connected to the housing 1 so that the pinion shaft 7 is braked under the brake pressure. The brake pressure can be adjusted by means of setscrew 29.

To turn the weaving machine over manually an intermediate position of forked lever 2 will maintain the clutch disc 12 between brake ring 17 and flywheel 16. This is accomplished by means such as that shown in the patent, above noted.

In comparison to known devices of this kind the power unit as per the invention incorporates the following advantages:

The weaving machine can be brought to operating speed quickly because the motor is equipped with a flywheel 16 which rotates with the motor when the driving unit is stopped. On clutching-in the flywheel 16 transfers its energy to the clutch disc 12 and so helps the motor to bring the weaving machine quickly to its operating speed.

The clutch or brake moment, can be set from outside by means of setting screws.

The clutch disc 12 can absorb all reasonable inconsistencies of parallelism of the motor or the flywheel disc 16 or of the brake ring 17, respectively, through the flexibility of the membrane 19 (or the spokes 36) and the elastic discs 13.

The motor can be easily replaced at any time. It is, in effect, easily removable but when coupled, the unit and motor become functionally integral. The full clutch pressure is to be overcome at the ratio of the lever 2 only at the end of the stroke of the lever by overtensioning the springs 24. However, the force of the brake spring 28 acts constantly on the lever 2. The brake pressure is also increased by the ratio of the lever 2 so that a comparatively small force at the lever 2 can effect a relatively large clutch or brake moment.

This disclosure of preferred embodiments of the invention is to be interpreted as illustrative of forms the invention may take and modifications will readily occur to those skilled in the art. The invention is not to be restricted except by the scope of the appended claims wherein the novel features desired to be protected by Letters Patent are set forth:

I claim:

1. A driving unit particularly for weaving machines, having a housing to which an electric motor with a flywheel may be coupled, a power takeoff shaft separated from the motor shaft but axially aligned therewith and rotatable in said housing, a clutch disc and a brake disc in said housing, characterized in that, the clutch disc is provided with friction linings, one at one side aligned with a clutch surface of the motor flywheel when the latter is in place and the other of which aligns with a cooperating surface of the brake disc, said power takeoff shaft being restrained against axial displacement said clutch plate being axially movable with respect to the power takeoff shaft being restrained against axial displacement, said clutch plate being axially movable with respect to the power takeoff shaft and connected for rotation therewith only by an elastic deformable disclike member, a yoke for selectively causing said clutch plate to engage the motor flywheel face for driving or the brake disc for stopping the power takeoff shaft and adjustable resilient means about which the yoke pivots at one end, means axially movable within the power takeoff shaft and having connection to a member rotatable with that shaft and another member nonrotatable therewith to which said yoke is connected intermediate its ends, and another resilient means at the opposite end of said yoke for biasing it in one direction and against which it is moved in one direction to perform one of its functions, and by which it is moved in the opposite direction to effect the other of its functions.

2. A drive unit as define in claim 1, characterized in that a membrane (19) made of spring steel is provided as the elastic-deformable disclike member.

3. A drive unit as defined in claim 1, characterized in that a membrane (19) made of plastic material is provided as the elastic-deformable disclike member.

4. A derive unit as defined in claim 1, characterized in that the elastic-deformable member comprises spoke elements (36).

5. A drive unit as defined in claim 1, characterized in that the motor (30) has a flange mounting and is axially adjustable in relation to the housing (1) by means of tension and compression screws (34, 35).

6. A drive unit as defined in claim 1, characterized in that the power takeoff shaft (7) has slideable thereon a bush (6) serving as a part of a bearing for axial displacement of the clutch disc (12) and the shaft and bush are provided with a plastic coating (33) in that range over which they are relatively movable.

7. A drive unit as defined in claim 1, characterized in that the clutch disc (12) is held between a driving disc (11) and a flange (14) and that circular, ring-shaped discs displacement of elastic-deformable material are positioned between the adjacent faces of the clutch disc and the driving disc and flange.

UNITED STATES PATENT OFFICE
CERTIFICATE OF CORRECTION

Patent No. 3,557,919          Dated January 26, 1971

Inventor(s) Franz Speich

It is certified that error appears in the above-identified patent and that said Letters Patent are hereby corrected as shown below:

At the title page, Assignees name is: George Fischer Ltd. Brugg

Assignee's address is: Brugg, Aargau, Switzerland

Column 2, line 54, change "spring" to --springs-- line 74, change "mount" to --amount--

Column 4, cancel lines 12 and 13.

line 17, insert a --comma-- after "shaft" and change "and" to --an-- line 48, cancel "displacement" and insert --(13)

Signed and sealed this 13th day of July 1971.

(SEAL)
Attest:

EDWARD M. FLETCHER, JR.          WILLIAM E. SCHUYLER,
Attesting Officer                Commissioner of Paten